United States Patent [19]
Schramme et al.
[11] 4,407,042
[45] Oct. 4, 1983

[54] GROMMET ASSEMBLY WITH PANEL ATTACHING MEANS

[75] Inventors: Stephan H. Schramme, Cortland; Mark A. Kelley, Warren, both of Ohio

[73] Assignee: General Motors Corporation, Detroit, Mich.

[21] Appl. No.: 307,769

[22] Filed: Oct. 2, 1981

[51] Int. Cl.[3] .................... H01B 17/14; H02B 1/10; F16L 5/02

[52] U.S. Cl. .................................. 16/2; 174/153 G; 174/155; 248/56; 339/126 RS; 403/197

[58] Field of Search ............ 339/126 R, 126 RS, 128, 339/103 B, 125 R, 729, 130; 174/65 G, 152 G, 153 G, 155; 248/56; 52/220; 285/205, 206; 16/2, 108; 403/197

[56] References Cited

U.S. PATENT DOCUMENTS

| | | | |
|---|---|---|---|
| 2,078,453 | 4/1937 | Miller | 248/56 |
| 2,424,757 | 7/1947 | Klumpp, Jr. | 174/153 |
| 2,813,692 | 11/1957 | Bremer et al. | 248/56 |
| 2,938,188 | 5/1960 | Lazzery | 339/128 X |
| 3,057,001 | 10/1962 | Rapata | 16/2 |
| 3,163,882 | 1/1965 | Falkenberg | 16/2 |
| 3,236,204 | 2/1966 | Joseph | 174/153 G X |
| 3,285,551 | 11/1966 | Tschanz | 248/56 |
| 3,339,050 | 8/1967 | Mitchell | 174/153 G X |
| 3,751,579 | 8/1973 | Nojiri | 248/56 X |
| 3,836,269 | 9/1974 | Koscik | 403/197 |
| 4,066,323 | 1/1978 | Norden | 339/126 R |
| 4,252,393 | 2/1981 | Johnson | 339/75 MP |
| 4,269,075 | 5/1981 | Crist et al. | 339/126 R X |
| 4,272,645 | 6/1981 | Kornatowski | 174/65 G |
| 4,289,924 | 9/1981 | Pearce, Jr. et al. | 174/152 G |

FOREIGN PATENT DOCUMENTS

| | | |
|---|---|---|
| 1519268 | 4/1967 | France . |
| 7625517 | 4/1977 | France . |

*Primary Examiner*—Gil Weidenfeld
*Assistant Examiner*—John S. Brown
*Attorney, Agent, or Firm*—F. J. Fodale

[57] ABSTRACT

A grommet assembly has a two-piece grommet comprising a shank and a flange at a rearward end of the shank for locating the shank in a panel aperture. The shank has a rigid projection at one side which is spaced from the flange to form a slot for receiving an edge portion of the panel and pivoting the shank into the aperture. The shank also has a flexible arm opposite the rigid projection which has spaced projections for engaging the backside of the panel when the shank is pivoted into the aperture. The assembly includes a gasket for sealing against the face of the panel and a U-shaped retainer which is mounted on the shank after insertion for securely fastening the grommet assembly to the panel and insuring a good face seal at the gasket.

4 Claims, 7 Drawing Figures

22 58 60 59 62 10 50 52 22 54 54 16 48 30 32 38 24 26 24 24 28 26 14 43

GROMMET ASSEMBLY WITH PANEL ATTACHING MEANS

This invention relates generally to grommets and, more particularly, to a hard plastic grommet which is attached to an apertured bulkhead panel or the like.

U.S. patent application Ser. No. 190,446, now U.S. Pat. No. 4,289,924 filed Sept. 24, 1980 by Warren Pearce, Jr. et al and assigned to General Motors Corporation discloses an Injectable Grommet Assembly. The Injectable Grommet Assembly comprises two hard plastic shells 16 and 18 which are assembled around a bundle of cables and form a hard plastic grommet which is injected with a sealant. The shells also include flange segments 26 and 58 which form a mounting flange having bosses 36 and 72 which are used to attach the grommet assembly to an apertured bulkhead panel 14 by bolts or the like. The grommet assembly includes a gasket 22 for sealing against the face of the panel.

U.S. Pat. No. 3,057,001 granted to George M. Rapata on Oct. 9, 1962 discloses a Strain Relief Grommet. The grommet is attached to an apertured panel 24 by inserting a shank portion 38 into the panel aperture and engaging the backside of the panel 24 by shoulders on the shank portion 38. At least one of the shoulders which engages the backside of the panel is on a flexible finger which is collapsed and then expanded as the shank portion is inserted into the panel aperture.

The object of this invention is to provide a hard plastic grommet assembly having an improved panel attaching means.

One feature of the invention is that the grommet assembly has a shank which engages a panel edge portion and pivots into position in the panel aperture which facilitates panel attachment, particularly in blind or difficult assembly operations.

Another feature of the invention is that the shank has a flexible latch arm which has longitudinally spaced projections for engaging the backside of the panel.

Another feature of the invention is that the shank has a portion which is sized to locate the shank in panel aperture in both the horizontal and vertical directions.

Another feature of the invention is the grommet assembly has a retainer which is mounted on the shank after panel insertion to insure secure fastening to the panel and a good seal at the face of the panel.

Other objects and features of the invention will become apparent to those skilled in the art as the following detailed description of the preferred embodiment of the invention as illustrated in the accompanying sheets of drawing in which.

Figure 1:
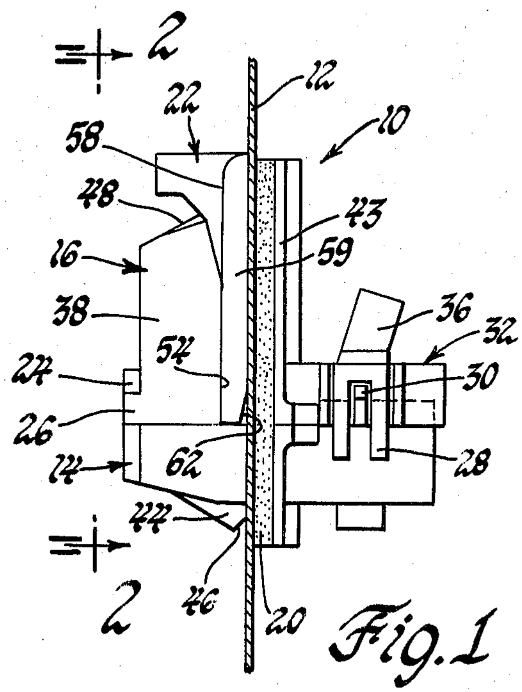
FIG. 1 is a side view showing the grommet assembly of this invention attached to an apertured bulkhead panel.
Figure 2:
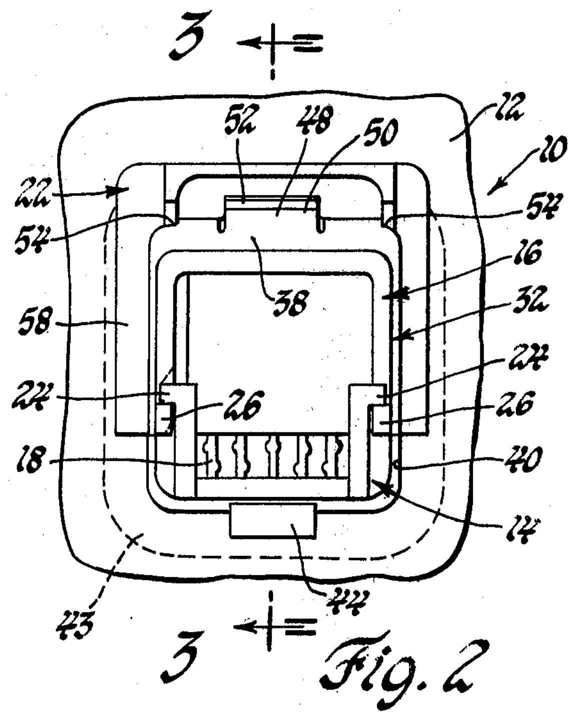
FIG. 2 is a front view of the grommet assembly and panel shown in FIG. 1.

Referring now to the drawing, FIGS. 1 and 2 show a grommet assembly 10 attached to an apertured bulkhead panel 12.

The grommet assembly 10 comprises two snap assembled shells 14 and 16, a cable clip 18, a gasket 20 and a retainer 22.

The shells 14 and 16 are made of a hard plastic material, such as nylon, and are adapted to be assembled around a bundle of cables (not shown). A cable clip 18 is mounted in a hollow portion of the shell 14 to separate the cables. The shells 14 and 16 are attached to each other by structure which facilitates the snap assembly of the two shells. More specifically, the shell 14 has two lateral lugs 24 at the forward or insertion end which cooperate with two longitudinal lugs 26 at the forward end of the shell 16; and a pair of upstanding latch arms 28 at the rearward or trailing end which cooperate with a pair of lateral nibs 30 at the rearward or trailing end of the shell 16. The shells 14 and 16 are attached to each other by hooking the longitudinal lugs 26 under the lateral lugs 24 at the forward end and swinging the shells 14 and 16 into an abutting position so that latch arms 28 at the rearward end snap-over the nibs 30 and lock the shells together. This snap assembly and retention feature, per se, is not a part of this invention.

The attached shells 16 and 18 form a hard plastic grommet 32 which has a chamber 34 housing the cable clip 18. The chamber 34 is filled with a sealant through an inlet 36. This sealant forms a fluid tight seal for a bundle of cables (not shown) which passes through the chamber 34 and is separated in the chamber 34 by the cable clip 18 as described in the Pearce et al patent application mentioned in the introduction.

The novel features of this invention reside in the means for attaching the grommet assembly 10 to the apertured bulkhead panel 12.

The grommet 32 formed by the shells 14 and 16 has a shank 38 at the forward or insertion end. The forward portion of the shank 38 is tapered to facilitate insertion into the panel aperture 40 and the rearward portion 42 is shaped to substantially fill the aperture 40 so that the shank 38 is located horizontally as well as vertically in the aperture 40. The grommet 32 has a flange 43 at the rearward end of the shank 38. The top wall of the forward tapered portion of the shank 38 has a considerably steeper taper than the bottom and side walls so that the shank 38 can be inserted into the panel aperture 40 in a cocked position and pivoted into a tightly retained position as explained more fully below.

The bottom wall of the shank 38 has a rigid projection 44 which is spaced from the flange 43 to form a slot 45 which receives a lower edge portion of the panel 12 which is adjacent the aperture 40. The rigid projection 44 has a convex cam surface 46 which engages the backside of the panel 12 and guides the lower edge portion of the panel 12 deeper into the slot 45.

The top wall of the shank 38 has a flexible arm 48 which is attached at the forward end and projects rearwardly toward the flange 43. The flexible arm 48 has two longitudinally spaced projections 50 and 52 for engaging the backside of the panel 12.

Figure 4:
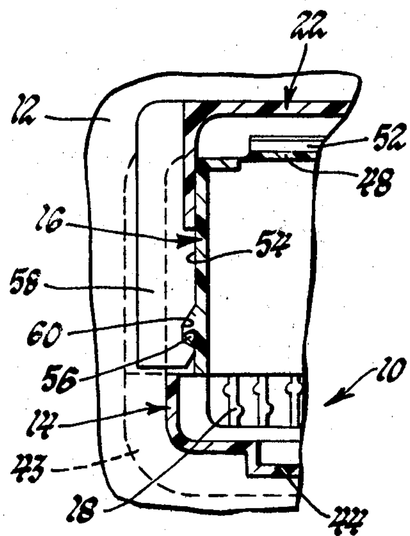
FIG. 4 is a fragmentary section taken substantially along the line 4—4 of FIG. 3 and looking in the direction of the arrows.

The side walls of the shank 38 each have a slot 54 which is spaced from and parallel to the flange 43. The sides of the slots 54 which are remote from the flange 43 are tapered at the upper end to guide the retainer 22 into the slots 54. One of the slots 54 has a projection 56 (shown in FIG. 4) for locking the retainer 22 in place on the shank 38.

The retainer 22 comprises a flat, U-shaped body 58 which has a U-shaped peripheral flange 59 which projects toward the flange 43 and engages the backside of the panel 12 when the retainer 22 is locked in place by a notch 60 in the U-shaped body 58 which engages the projection 54. The bottom ends of the U-shaped flange 58 are tapered at 62 to facilitate insertion of the retainer 22 into the slots 54.

After the grommet 32 is assembled around the bundle of cables, the gasket 20 is placed on the shank 38 against the flange 43 and the chamber 34 is filled with a sealant.

Figure 6:
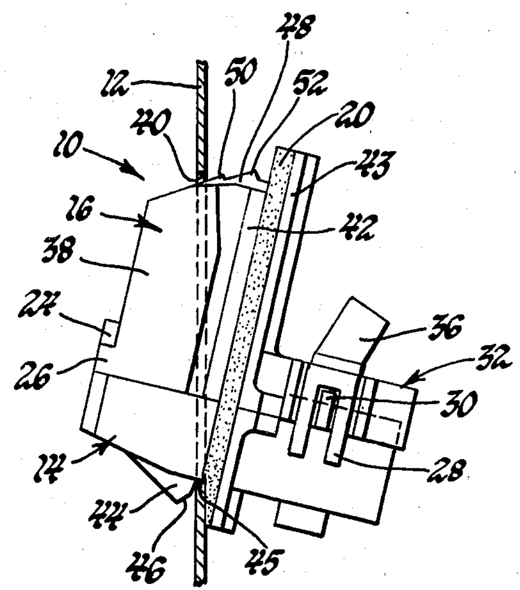
FIGS. 6 and 7 are side views showing partial attachments of the grommet assembly to the apertured panel.

The grommet 32 and gasket 20 are then assembled to the panel 12 by inserting the shank 38 downwardly into the aperture 40 in a cocked position so that the edge portion of the panel 12 is received in the slot 45 between the rigid projection 44 and the gasket 20 which lies against the flange 43 as shown in FIG. 6. The convex surface 46 guides the edge portion deeper into the slot 45 while the resilient nature of the gasket 20 permits the cocked orientation of the grommet 32 with respect to the panel 12.

Figure 3:
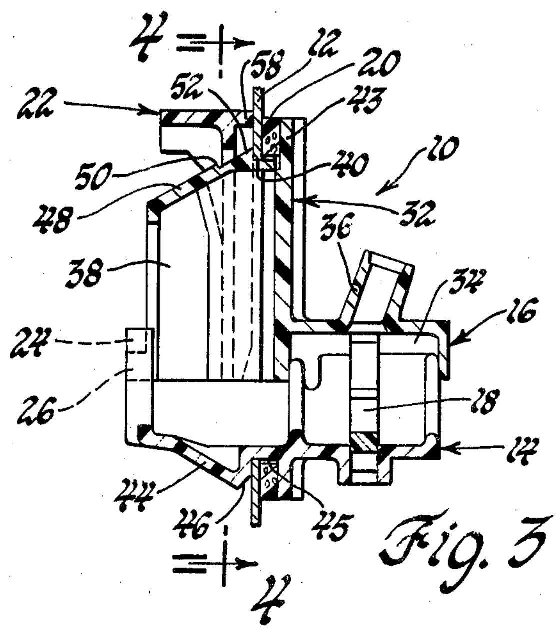
FIG. 3 is a section taken substantially along the line 3—3 of FIG. 2 and looking in the direction of the arrows.
Figure 5:
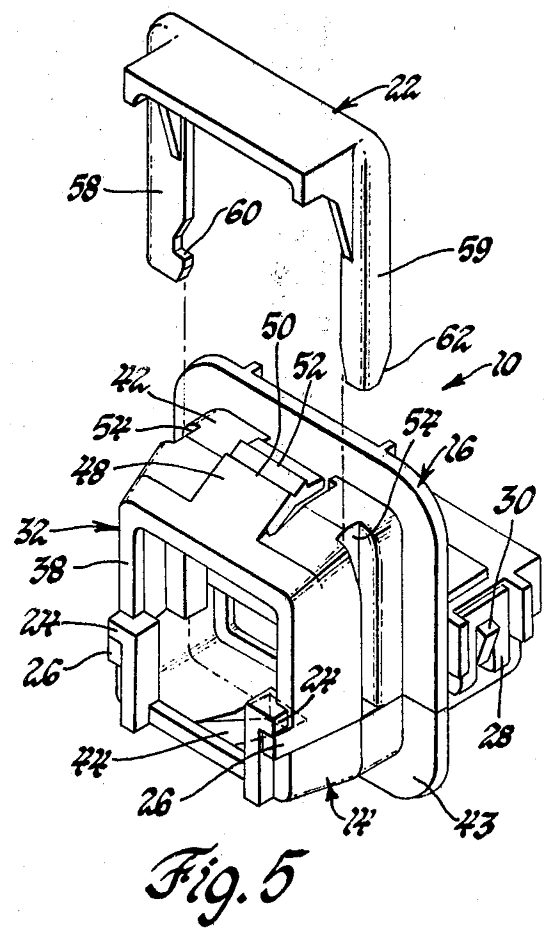
FIG. 5 is an exploded perspective view of the grommet assembly shown in FIGS. 1-4. The gasket has been omitted for clarity.

When the edge portion is properly disposed in the slot 45, the grommet 32 is pivoted on the edge portion of the panel to the upright position shown in FIG. 3 where the projection 52 on the latch arm 48 engages the rear side of the panel 12. The retainer 22 is then assembled to the shank 38 by sliding the legs of the U-shaped body 58 into the slots 54. The retainer insures that the grommet 32 is securely fastened to the panel 12 and that the gasket 20 is compressed to form a good seal between the flange 43 and the front side of the panel 12.

In many instances, the panel aperture 40 is not easily accessible and mounting the grommet 32 and the gasket 20 on the panel 12 is a difficult or blind assembly operation. The above assembly procedure facilitates these assembly operations since the assembly is relatively easy once the edge portion is disposed in the slot 45.

Figure 7:
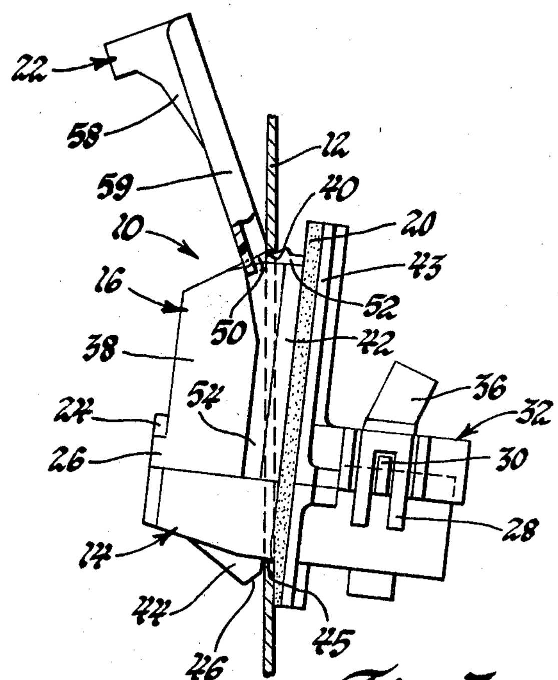

The grommet 32 also includes a temporary retention feature in the form of a second projection 50 on the flexible arm 48 to further facilitate difficult or blind assembly operations. In difficult situations, the grommet 32 and gasket 20 need only be pivoted on the edge portion of the panel to a temporary retention position where the projection 50 engages the backside of the panel 12 as shown in FIG. 7. The retainer 22 is still insertable into the slots 54 in the temporary retention position. The subsequent assembly of the retainer 22 automatically uprights the grommet 32 and securely fastens the grommet 32 while insuring a good face seal at the gasket 20.

We wish it to be understood that we do not desire to be limited to the exact details of construction shown and described, for obvious modifications will occur to a person skilled in the art.

The embodiments of the invention in which an exclusive property or privilege is claimed are defined as follows:

1. A grommet assembly having means for attaching the grommet assembly to an apertured bulkhead panel or the like comprising;

a shank which is insertable into a panel aperture and which has a rearward portion sized so as to substantially locate the shank horizontally and vertically in the aperture, a flange at a rearward end of the shank for locating the rearward portion of the shank in the panel aperture, a rigid projection at one side of the shank which is spaced from the flange for engaging a backside of the panel, a flexible arm opposite the rigid projection which is attached to a forward end of the shank and projects toward the flange, said flexible arm having longitudinally spaced projections for engaging the backside of the panel, a pair of slots in the shank which are spaced from and generally parallel to the flange, and a U-shaped retainer which slides into the pair of slots and which has portions for engaging the backside of the panel and securely fastening the grommet assembly to the panel.

2. A grommet assembly having means for attaching the grommet assembly to an apertured bulkhead panel or the like comprising;

a shank which is insertable into a panel aperture and which has a forward tapered portion and a rearward portion sized so as to substantially locate the shank horizontally and vertically in the aperture, a flange at a rearward end of the shank for locating the rearward portion of the shank in the panel aperture, a rigid projection at one side of the shank which is spaced from the flange for engaging a backside of the panel, a flexible arm opposite the rigid projection which is attached to a forward end of the shank and projects toward the flange, said flexible arm having longitudinally spaced projections for engaging the backside of the panel, a pair of slots in the shank which are spaced from and generally parallel to the flange, a gasket mounted on the rearward portion of the shank against the flange, and a U-shaped retainer which slides into the pair of slots and which has portions for engaging the backside of the panel and securely fastening the grommet assembly to the panel.

3. A grommet assembly having means for attaching the grommet assembly to an apertured bulkhead panel or the like comprising;

a grommet having a shank and a flange at a rearward end of the shank for locating a rearward portion of the shank in a panel aperture, a rigid projection at one side of the shank which is spaced from the flange to form a slot for receiving an edge portion of the panel adjacent the aperture, said shank being tapered so as to pivot on the edge portion of the panel into the aperture, a flexible arm opposite the rigid projection which is attached to a forward end of the shank and projects toward the flange, said flexible arm having a projection for engaging the backside of the panel when the shank is pivoted into the aperture, a pair of slots in the shank which are spaced from and generally parallel to the flange, and a U-shaped retainer which slides into the pair of slots and which has portions for engaging the backside of the panel and securely fastening the grommet assembly to the panel.

4. A grommet assembly having means for attaching the grommet assembly to an apertured bulkhead or the like comprising;

a shank which is insertable into a panel structure and which has a rearward portion sized so as to substantially locate the shank horizontally and vertically in the aperture, a flange at a rearward end of the shank for locating the rearward portion of the shank in the panel aperture, a rigid projection at one side of the shank which has a convex surface which is spaced from the flange to form a slot for receiving an edge portion of the panel adjacent the aperture, said shank having a forward tapered portion so as to pivot on the edge portion of the panel into the aperture, a flexible arm opposite the rigid projection which is attached to a forward end of the shank and projects toward the flange, said flexible arm having a longitudinally spaced projection for engaging the backside of the panel when the shank is pivoted into the aperture, a pair of slots in the shank which are spaced from and generally parallel to the flange, a gasket mounted on the rearward portion of the shank against the flange, and a U-shaped retainer which slides into the pair of slots and which has portions for engaging the backside of the panel and securely fastening the grommet assembly to the panel.

* * * * *